United States Patent
Zhang et al.

(10) Patent No.: US 9,439,154 B2
(45) Date of Patent: Sep. 6, 2016

(54) POWER CONTROL METHOD, USER EQUIPMENT, AND BASE STATION FOR CARRIER AGGREGATION WITH DIFFERENT CONFIGURATIONS

(71) Applicant: HUAWEI TECHNOLOGIES CO., LTD., Shenzhen, Guangdong (CN)

(72) Inventors: Xingwei Zhang, Beijing (CN); Yongxia Lv, Beijing (CN); Lei Guan, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 385 days.

(21) Appl. No.: 14/039,569

(22) Filed: Sep. 27, 2013

(65) Prior Publication Data

US 2014/0023028 A1  Jan. 23, 2014

Related U.S. Application Data

(63) Continuation of application No. PCT/CN2012/071852, filed on Mar. 2, 2012.

(30) Foreign Application Priority Data

Mar. 29, 2011  (CN) .......................... 2011 1 0077082

(51) Int. Cl.
  *H04W 4/00*    (2009.01)
  *H04W 52/22*   (2009.01)
  (Continued)

(52) U.S. Cl.
  CPC ......... *H04W 52/221* (2013.01); *H04W 52/325* (2013.01); *H04W 52/146* (2013.01); *H04W 52/34* (2013.01)

(58) Field of Classification Search
  CPC ........... H04W 52/221; H04W 52/325; H04W 52/146; H04W 52/34
  See application file for complete search history.

(56) References Cited

U.S. PATENT DOCUMENTS

2004/0229572 A1  11/2004  Cai et al.
2010/0232382 A1*  9/2010  Gauvreau ............. H04W 72/02
                                                 370/329

(Continued)

FOREIGN PATENT DOCUMENTS

| CN | 1784909 | 6/2006 |
|----|---------|--------|
| CN | 101702823 | 5/2010 |

(Continued)

OTHER PUBLICATIONS

3rd Generation Partnership Project; Technical Specification Group Radio Access Network; Evolved Universal Terrestrial Radio Access (E-UTRA); Physical layer procedures (Release 10), 3GPP TS 36.213 V10.0.1, Dec. 2010, pp. 1-98.

(Continued)

*Primary Examiner* — Abdelnabi Musa
(74) *Attorney, Agent, or Firm* — Staas & Halsey LLP

(57) ABSTRACT

Embodiments of the present invention disclose a power control method, a user equipment, and a base station. The method according to an embodiment of the present invention includes the following: a user equipment UE receives a transmitter power control TPC command sent by a base station, where the TPC command is used to indicate a power adjustment value of one carrier; and if the UE does not send a physical uplink control channel PUCCH in a previous uplink subframe of a current uplink subframe of the one carrier, performing, by the UE, according to a PUCCH transmit power used when the UE sends a latest PUCCH from among multiple carriers and the power adjustment value, TPC accumulation to obtain an updated PUCCH transmit power of the one carrier, where the multiple carriers include the one carrier.

15 Claims, 7 Drawing Sheets

(51) Int. Cl.
*H04W 52/32* (2009.01)
*H04W 52/14* (2009.01)
*H04W 52/34* (2009.01)

(56) References Cited

U.S. PATENT DOCUMENTS

| | | | | |
|---|---|---|---|---|
| 2011/0044296 A1* | 2/2011 | Zhang | ............... | H04B 7/0404 370/336 |
| 2011/0105173 A1* | 5/2011 | Haim | ............... | H04W 52/244 455/522 |
| 2011/0243087 A1* | 10/2011 | Ahn | ............... | H04W 52/146 370/329 |
| 2011/0274064 A1* | 11/2011 | Luo | ............... | H04W 52/325 370/329 |
| 2013/0242913 A1* | 9/2013 | Lan | ............... | H04L 5/001 370/329 |

FOREIGN PATENT DOCUMENTS

| | | |
|---|---|---|
| CN | 101720122 | 6/2010 |
| EP | 2498554 | 9/2012 |
| WO | WO2010/074504 | 7/2010 |

OTHER PUBLICATIONS

Power control and PUCCH for LTE-A TDD, 3GPP TSG-RAN WG1 #64, R1-110984, Taipei, Feb. 21-25, 2011 (4 pp.).

International Search Report and Written Opinion, dated May 24, 2012, in corresponding International Application No. PCT/CN2012/071852 (10 pp.).

Extended European Search Report, dated Nov. 21, 2013, in corresponding European Application No. 12763664.5 (13 pp.).

International Search Report, dated May 24, 2012, in corresponding International Application No. PCT/CN2012/071852 (4 pp.).

Office Action, dated Dec. 16, 2015, in corresponding Chinese Application No. 201110077082.6 (7 pp.).

* cited by examiner

POWER CONTROL METHOD, USER EQUIPMENT, AND BASE STATION FOR CARRIER AGGREGATION WITH DIFFERENT CONFIGURATIONS

CROSS-REFERENCE TO RELATED APPLICATIONS

This application is a continuation of International Application No. PCT/CN2012/071852, filed on Mar. 2, 2012, which claims priority to Chinese Patent Application No. 201110077082.6, filed on Mar. 29, 2011, both of which are hereby incorporated by reference in their entireties.

TECHNICAL FIELD

The present invention relates to the field of communications, and in particular, to a power control method, a user equipment, and a base station.

BACKGROUND

A Long Term Evolution Advanced (LTE-A, Advance Long Term Evolution) system is an enhanced LTE system; the LTE-A system uses a carrier aggregation (CA, Carrier Aggregation) technology as a method for expanding a bandwidth of the LTE-A system. The main idea of the CA is to aggregate multiple component carriers (CC, Component Carrier) into a carrier with a larger bandwidth to support a high data rate.

In a CA scenario of LTE-A release 10, one user equipment (UE, User Equipment) supports a maximum of five CCs; for a time division duplex (TDD, Time Division Duplex) system, multiple CCs used for carrier aggregation CA need to use the same TDD mode uplink and downlink subframe configuration.

Multiple CCs of the UE include a primary component carrier (PCC, Primary Component Carrier) and a secondary component carrier (SCC, Secondary Component Carrier). Physical uplink control channel (PUCCH, Physical Uplink Control Channel) information of the UE can be sent only in an uplink subframe of the PCC.

For the PCC, when the UE receives a transmitter power control (TPC, Transmitter Power Control) command sent by a base station, the UE queries a PUCCH transmit power of a previous uplink subframe, and performs TPC accumulation according to the found PUCCH transmit power so as to obtain a PUCCH transmit power in a current uplink subframe.

With the development of current technologies, the LTE-A can perform carrier aggregation with different configurations, that is, multiple CCs of the UE can use different TDD mode uplink and downlink subframe configurations. In this case, to maintain a synchronous hybrid automatic repeat request (HARQ, Hybrid Automatic Repeat request), for some time points when an A/N (ACK/NACK) needs to be fed back, a subframe corresponding to the PCC may be a downlink subframe at this time. Therefore, a PUCCH that can be sent only on the PCC may be sent on a certain SCC which corresponds to an uplink subframe at this time. In consideration of compatibility, so long as a current subframe of the PCC is an uplink subframe, the PUCCH is sent on the PCC; the PUCCH is considered to be sent on the SCC only when the current subframe of the PCC is a downlink subframe and the subframe needs to send an A/N. Therefore, the SCC is not always used to send a PUCCH in each uplink subframe, and may also be used to send physical uplink shared channel (PUSCH, Physical Uplink Shared CHannel) information only. When the UE needs to perform power adjustment according to a received TPC command, if a previous uplink subframe on the SCC does not send a PUCCH, the UE cannot perform power control according to a manner of LTE-A release 10. Therefore, the prior art does not provide a specific manner of performing power control in the case of aggregation carrier with different configurations.

SUMMARY

Embodiments of the present invention provide a power control method, a user equipment, and a base station, so that power control can be performed in the case of carrier aggregation with different configurations. The technical solution is implemented in the following manners:

A power control method includes:

receiving, by a user equipment UE, a transmitter power control TPC command sent by a base station, where the TPC command is used to indicate a power adjustment value of one carrier; and if the UE does not send a physical uplink control channel PUCCH in a previous uplink subframe of a current uplink subframe of the one carrier, performing, by the UE, according to a PUCCH transmit power used when the UE sends a latest PUCCH from among multiple carriers and the power adjustment value, TPC accumulation to obtain an updated PUCCH transmit power of the one carrier, where the multiple carriers include the one carrier.

A power control method includes:

if a base station does not receive, in a previous uplink subframe of a current uplink subframe on one carrier, a physical uplink control channel PUCCH sent by a user equipment UE, determining, by the base station, according to a PUCCH transmit power used when the UE sends a latest PUCCH from among multiple carriers, a power adjustment value of the one carrier, where the multiple carriers include the one carrier;

generating, by the base station, a transmitter power control TPC command that carries the power adjustment value of the one carrier; and sending, by the base station, the TPC command to the UE, to notify the UE of the power adjustment value of the one carrier.

A power control method includes:

receiving, by a user equipment UE, a transmitter power control TPC command sent by a base station, where the TPC command is used to indicate a power adjustment value of an SCC; and performing, by the UE, according to a PUCCH transmit power used when a latest physical uplink control channel PUCCH is sent on the SCC and the power adjustment value, TPC accumulation to obtain an updated PUCCH transmit power of the SCC.

A power control method includes:

determining, by a base station, according to a PUCCH transmit power used when a UE sends a latest physical uplink control channel PUCCH on an SCC, a power adjustment value of the SCC;

generating, by the base station, a transmitter power control TPC command that carries the power adjustment value of the SCC; and sending, by the base station, the TPC command to the UE, to notify the UE of the power adjustment value of the SCC.

A user equipment includes:

a command receiving unit, configured to receive a transmitter power control TPC command sent by a base station, where the TPC command is used to indicate a power adjustment value of one carrier; and a power accumulating unit, configured to, if the user equipment does not send a physical uplink control channel PUCCH in a previous uplink subframe of a current uplink subframe of the one carrier, perform, according to a PUCCH transmit power used when the UE sends a latest PUCCH from among multiple carriers and the power adjustment value, TPC accumulation to obtain an updated PUCCH transmit power of the one carrier, where the multiple carriers include the one carrier.

A user equipment includes:

a receiving unit, configured to receive a transmitter power control TPC command sent by a base station, where the TPC command is used to indicate a power adjustment value of an SCC; and an accumulating unit, configured to perform, according to a PUCCH transmit power used when a latest physical uplink control channel PUCCH is sent on the SCC and the power adjustment value, TPC accumulation to obtain an updated PUCCH transmit power of the SCC.

A base station includes:

a determining unit, configured to, when the base station does not receive, in a previous uplink subframe of a current uplink subframe on one carrier, a physical uplink control channel PUCCH sent by a user equipment UE, determine, according to a PUCCH transmit power used when the UE sends a latest PUCCH from among multiple carriers, a power adjustment value of the one carrier, where the multiple carriers include the one carrier;

a generating unit, configured to generate a transmitter power control TPC command that carries the power adjustment value of the one carrier; and a sending unit, configured to send the TPC command to the UE, to notify the UE of the power adjustment value of the one carrier.

A base station includes:

a power determining unit, configured to determine, according to a PUCCH transmit power used when a UE sends a latest physical uplink control channel PUCCH on an SCC, a power adjustment value of the SCC;

a command generating unit, configured to generate a transmitter power control TPC command that carries the power adjustment value of the SCC; and a command sending unit, configured to send the TPC command to the UE, to notify the UE of the power adjustment value of the SCC.

As can be seen from the foregoing technical solution, the embodiments of the present invention have the following advantages:

In the embodiments of the present invention, after a UE receives a TPC command from a base station, if the UE does not send a PUCCH in a previous uplink subframe of a current uplink subframe on one carrier, the UE can acquire, according to multiple carriers, a PUCCH transmit power used when a latest PUCCH is sent, and perform, according to the transmit power and the TPC command, TPC accumulation. Because the UE can acquire the PUCCH transmit power according to multiple carriers and when an A/N is sent, a PUCCH is sent in an uplink subframe of a certain carrier, the UE can acquire a historical value of the PUCCH transmit power to perform power adjustment. Therefore, power control can be performed in the case of carrier aggregation with different configurations.

DESCRIPTION OF EMBODIMENTS

Embodiments of the present invention provide a power control method, a user equipment, and a base station, so that power control can be performed in the case of carrier aggregation with different configurations.

Figure 1:
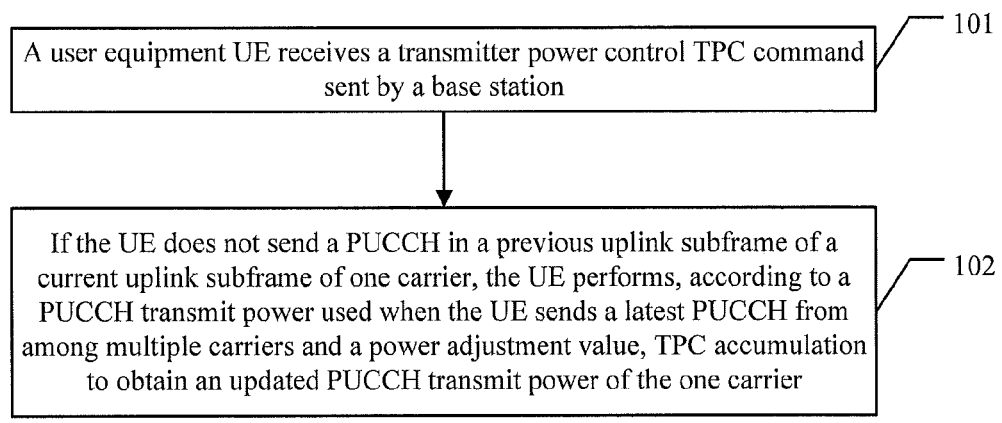
FIG. 1 is a schematic diagram of a power control method according to an embodiment of the present invention.

Referring to FIG. 1, a power control method according to an embodiment of the present invention includes the following steps:

101. A UE receives a TPC command sent by a base station.

In this embodiment, when determining that control needs to be performed on a transmit power of the UE, the base station sends a TPC command to the UE, where the TPC command is used to indicate a power adjustment value of one carrier, that is, the TPC command corresponds to a power adjustment value of a certain carrier.

It should be noted that in this embodiment, the base station may determine, according to a signal to interference plus noise ratio (SINR) of the UE and a signal to interference plus noise ratio threshold, whether control needs to be performed on the transmit power of the UE. It can be understood that in actual applications, the base station may also determine, in other manners, whether control needs to be performed on the transmit power of the UE. The specific manner is not limited herein.

102. If the UE does not send a physical uplink control channel PUCCH in a previous uplink subframe of a current uplink subframe of one carrier, the UE performs, according to a PUCCH transmit power used when the UE sends a latest PUCCH from among multiple carriers and the power adjustment value, TPC accumulation to obtain an updated PUCCH transmit power of the one carrier.

In this embodiment, the base station may allocate multiple carriers to the UE, where these carriers are called a configured carrier set.

In each embodiment of the present invention, the performing TPC accumulation is performing adjustment on a transmit power of the PUCCH by using the power adjustment value. The sending a latest PUCCH refers to sending a PUCCH at a moment closest to the current moment, for example, a current subframe.

The UE can send and receive control information on activated carriers, where these activated carriers may be scheduled to transmit uplink/downlink data.

After the UE receives a TPC command, if the UE does not send a PUCCH in a previous uplink subframe of a current uplink subframe of one carrier, the UE may acquire, according to multiple carriers, a PUCCH transmit power used when a latest PUCCH is sent, where the multiple carriers include the one carrier.

After acquiring the PUCCH transmit power used when the latest PUCCH is sent, the UE may perform, according to the PUCCH transmit power and a power adjustment value corresponding to the TPC command, TPC accumulation to obtain an updated PUCCH transmit power.

In this embodiment, after the UE receives a TPC command from the base station, if the UE does not send a PUCCH in a previous uplink subframe of a current uplink subframe on one carrier, the UE can acquire, according to multiple carriers, a PUCCH transmit power used when a latest PUCCH is sent, and perform TPC accumulation according to the transmit power and the TPC command. Because the UE can acquire the PUCCH transmit power according to multiple carriers and when an A/N is sent, a PUCCH must be sent in an uplink subframe of a certain carrier, the UE can always acquire a historical value of the PUCCH transmit power no matter on which carrier a current uplink subframe of the UE that needs to send a PUCCH is located. Therefore, power control can be performed in the case of carrier aggregation with different configurations.

Figure 2:
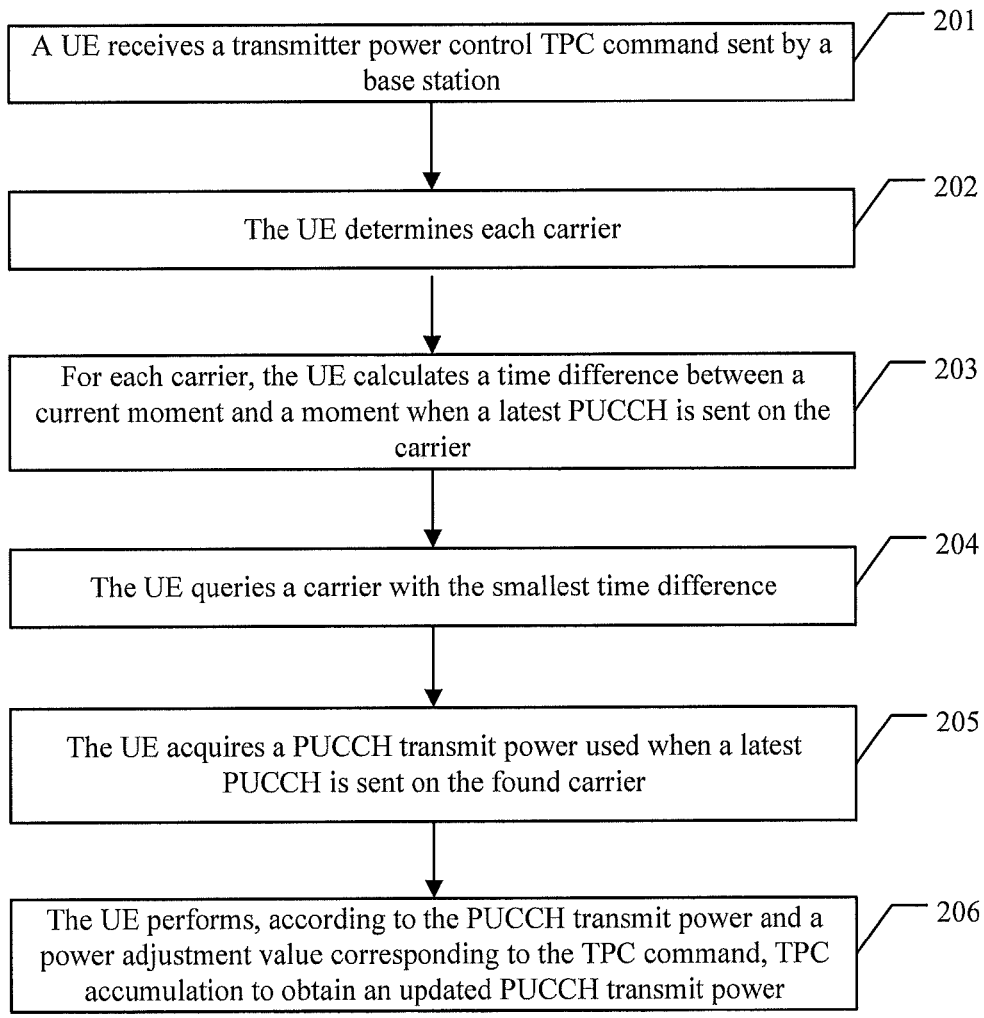
FIG. 2 is a schematic diagram of a power control method according to another embodiment of the present invention.

For ease of understanding, the following describes, by using a specific example, a power control method in detail according to the present invention. Referring to FIG. 2, a power control method according to another embodiment of the present invention includes the following steps:

201. A UE receives a TPC command sent by a base station.

Step 201 in this embodiment is similar to the content described in step 101 of the embodiment shown in the foregoing FIG. 1, and is not further described herein.

202. The UE determines each carrier.

The UE can send and receive control information on activated carriers, where the activated carriers can be scheduled to transmit uplink/downlink data, and the UE can obtain each current carrier, where all the carriers include the one carrier.

It should be noted that there is no fixed sequence between step 202 and step 201; step 201 may be executed first or step 202 may be executed first, and step 201 and step 202 may be executed concurrently. The specific sequence is not limited herein.

203. For each activated carrier, the UE calculates a time difference between a current moment and a moment when the latest PUCCH is sent on the carrier.

In this embodiment, after determining a carrier, the UE can calculate a time difference between the current moment and the moment when the latest PUCCH is sent on the carrier. The specific calculation manner is as follows:

The UE can query, according to a current uplink subframe, a reference subframe that is located in the same timeslot as the current uplink subframe on each carrier.

Because each carrier is aligned in terms of time sequence, the UE can query a corresponding reference subframe on each carrier.

After determining the reference subframe, for each carrier, the UE can query, starting from the reference subframe, a subframe in which the latest PUCCH is sent on the carrier, and then calculates a time difference between the subframe and the reference subframe.

204. The UE queries a carrier with the smallest time difference.

After calculating the time differences of all carriers, the UE selects the smallest time difference from the time differences of all carriers, and determines a carrier corresponding to the smallest time difference.

205. The UE acquires a PUCCH transmit power used when the latest PUCCH is sent on the found carrier.

The UE acquires, from the carrier corresponding to the smallest time difference, a PUCCH transmit power used when the latest PUCCH is sent.

206. The UE performs, according to the PUCCH transmit power and a power adjustment value corresponding to the TPC command, TPC accumulation to obtain an updated PUCCH transmit power.

In this embodiment, the UE can perform, according to the acquired PUCCH transmit power and the power adjustment value corresponding to the TPC command, TPC accumulation to obtain an updated PUCCH transmit power. For details, reference may be made to the following equation:

$$P_{PUCCH}(i) = \min(P_{CMAX}, P_{0\_PUCCH} + PL + h(n_{CQI}, n_{HARQ}) + \Delta_{F\_PUCCH}(F) + g(i));$$

Where $P_{PUCCH}(i)$ indicates a transmit power of a PUCCH in subframe i, $P_{CMAX} = \min(P_{EMAX}, P_{UMAX})$, $P_{CMAX}$ indicates an actual transmit power of the UE and is the smaller one between the maximum power transmission capability (which depends on the level of the UE) of the UE and the maximum transmit power issued by a network side.

$P_{0\_PUCCH}$ indicates an open loop power of the PUCCH, PL indicates path loss, $\Delta_{F\_PUCCH}(F)$ indicates compensation for different PUCCH formats, $h(n_{CQI}, n_{HARQ})$ indicates compensation for the number of bits of different uplink control information (UCI, Uplink Control Information) with the same PUCCH format, $n_{CQI}$ indicates the number of bits of the CQI, and $n_{HARQ}$ indicates the number of bits of the HARQ.

g(i) indicates a dynamic power control adjustment value of the PUCCH power of the current subframe i, which is calculated by using the following equation:

$$g(i) = g(i-1) + \sum_{m=0}^{M-1} \delta_{PUCCH}(i - k_m);$$

For the TDD, if subframe i is not an uplink subframe, g(i)=g(i−1), and $\delta_{PUCCH}$ indicates a power adjustment value corresponding to the TPC command and carried in the TPC command.

It should be noted that the TPC command received by the UE is at least one bit, a power adjustment value set is preset in the UE and the base station, and the UE can determine, according to the TPC command, a corresponding power adjustment value from the power adjustment value set.

For example, when a power adjustment value set in DCI format 3 is [−1, 0, 1, 3], the TPC command is two bits. For example, when the TPC command is 00, it indicates that the power adjustment value is −1 dB; when the TPC command is 11, it indicates that the power adjustment value is +3 dB.

When a power adjustment value set in DCI format 3A is [−1, 1], the TPC command is one bit. For example, when the TPC command is 0, it indicates that the power adjustment value is −1 dB; when the TPC command is 1, it indicates that the power adjustment value is +1 dB.

The UE can determine a corresponding power adjustment value according to the foregoing manner.

Because the UE may refer to PUCCH transmit power when a latest PUCCH is sent on all carriers, a certain error may exist. To reduce the error, the following manners may be used:

1. The amplitude of the power adjustment value is increased without changing the number of bits of the TPC command:

For example, the foregoing [−1, 0, 1, 3] is changed to [−3, 0, 3, 5], and the foregoing [−1, 1] is changed to [−3, 3]. Only one example is illustrated herein. It can be understood that in actual applications, other modification manners or values may also be used.

In this manner, the number of bits of the TPC command is not changed; the original two bits are still two bits, and the original one bit is still one bit. However, because the amplitude of the power adjustment value corresponding to the bit is increased, the amplitude of the power adjustment value can be increased.

2. The number of bits of the TPC command is increased to increase the amplitude of the power adjustment value:

For example, if two bits in DCI format 3 are increased to three bits, the power adjustment value set in DCI format 3 may be changed to [−5, −3, −1, 0, 1, 3, 5, 7]. Only one example is illustrated herein. It can be understood that in actual applications, other modification manners or values may also be used.

In this manner, the number of bits of the TPC command is increased; the original two bits may be three bits now, and the original one bit may be two bits now. Because the number of bits is increased, the number of power adjustment values corresponding to the TPC command is increased, so that the amplitude of the power adjustment value can be increased.

It should be noted that in the foregoing two modification manners, the changed power adjustment value set needs to be re-set in the UE and the base station.

3. The number of groups of power adjustment value sets is increased:

In this embodiment, the UE may preset multiple groups of power adjustment value sets, for example, [−3, 0, 3, 5], [−2, 0, 2, 4], [−1, 0, 1, 3], and the like.

In this case, the UE may determine a power adjustment value corresponding to the TPC command in the following manners:

(1) The UE uses a power adjustment value set with a largest amplitude by default. If finding that the amplitude is not supported during the use, the UE uses an original preset power adjustment value set.

For example, all UEs firstly use the power adjustment value set [−3, 0, 3, 5] by default; when finding that the amplitude is not supported during the use, the UE uses an original power adjustment value set, for example, [−1, 0, 1, 3].

(2) The UE receives radio resource control (RRC, Radio Resource Control) signaling from the base station, where the RRC signaling carries a TPC group identifier, and the UE determines a corresponding power adjustment value set according to the TPC group identifier, and uses the determined power adjustment value set.

It can be understood that in actual applications, the UE may also determine, in other manners, a power adjustment value set that needs to be used. The specific manner is not limited herein.

It should be noted that in this embodiment, the UE can query, on each carrier, an uplink subframe in which a latest PUCCH is sent on the carrier, that is, the UE needs to allocate to each carrier a storage area to store information of the uplink subframe in which a latest PUCCH is sent.

It can be understood that in actual applications, the UE may also set only one storage area. All the carriers are aligned in terms of time sequence and only one carrier sends a PUCCH when a PUCCH needs to be sent. Therefore, the UE can store, according to the time sequence and with respect to all the carriers, a PUCCH transmit power of a carrier sending a latest PUCCH among all the carriers.

In this embodiment, after a UE receives a TPC command from a base station, if the UE does not send a PUCCH in a previous uplink subframe of a current uplink subframe on one carrier, the UE can acquire, according to all carriers, a PUCCH transmit power used when a latest PUCCH is sent, and perform, according to the transmit power and the TPC command, TPC accumulation. Because the UE can acquire the PUCCH transmit power according to all the carriers and when an A/N is sent, a PUCCH must be sent in an uplink subframe of a certain carrier, the UE can always acquire a historical value of the PUCCH transmit power no matter on which carrier a current uplink subframe of the UE that needs to send a PUCCH is located. Therefore, power control can be performed in the case of carrier aggregation with different configurations.

In addition, in this embodiment, the UE can select, according to indication of the base station in RRC signaling, a corresponding power adjustment value set from multiple groups of power adjustment value sets, so that the amplitude of the power adjustment value can be increased, thereby making a power control process more precise.

Figure 3:
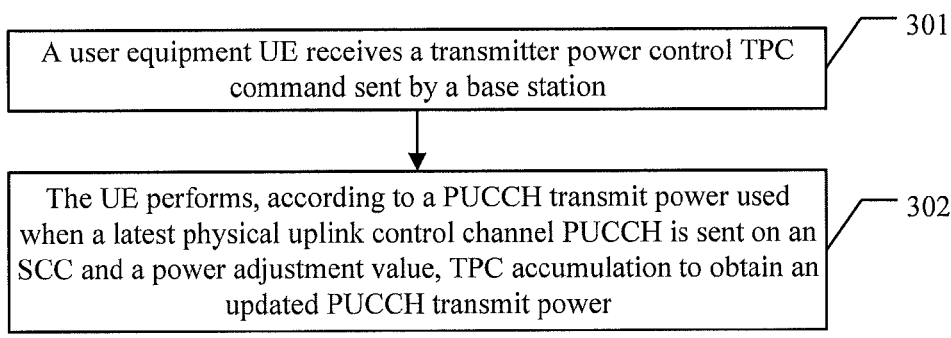
FIG. 3 is a schematic diagram of a power control method according to another embodiment of the present invention.

In the foregoing embodiment, the UE acquires, from among multiple carriers, a PUCCH transmit power used when a latest PUCCH is sent; in actual applications, the UE can also acquire, on an SCC, a PUCCH transmit power used when a latest PUCCH is sent. Referring to FIG. 3, a power control method according to another embodiment of the present invention includes the following steps:

301. A UE receives a TPC command sent by a base station.

In this embodiment, when determining that control needs to be performed on a transmit power of the UE, the base station sends a TPC command to the UE, where the TPC command is used to indicate a power adjustment value of an SCC, that is, the TPC command corresponds to a power adjustment value of the SCC.

It should be noted that in this embodiment, the base station may determine, according to a signal to interference plus noise ratio of the UE and a signal to interference plus noise ratio threshold, whether control needs to be performed on the transmit power of the UE. It can be understood that in actual applications, the base station may also determine, in other manners, whether control needs to be performed on the transmit power of the UE. The specific manner is not limited herein.

302. The UE performs, according to a PUCCH transmit power used when a latest physical uplink control channel PUCCH is sent on the SCC and the power adjustment value, TPC accumulation to obtain an updated PUCCH transmit power.

In each embodiment of the present invention, the performing TPC accumulation is performing adjustment on the transmit power of the PUCCH by using the power adjustment value. The sending a latest PUCCH refers to sending a PUCCH at a moment closest to the current moment, for example, a current subframe.

After receiving the TPC command from the base station, the UE knows that adjustment needs to be performed on the transmit power, and can know that adjustment needs to be performed on the transmit power of an SCC. In this case, the UE can acquire, on the SCC, a PUCCH transmit power used when a latest PUCCH is sent.

After acquiring the PUCCH transmit power used when a latest PUCCH is sent, the UE may perform, according to the PUCCH transmit power and a power adjustment value corresponding to the TPC command, TPC accumulation to obtain an updated PUCCH transmit power.

In this embodiment, after the UE receives a TPC command from the base station, the UE can acquire a PUCCH transmit power used when a latest PUCCH is sent on the SCC, and perform TPC accumulation according to the transmit power and the TPC command. Even if the UE does not send a PUCCH in a previous uplink subframe of the SCC, the UE can always acquire a historical value of the PUCCH transmit power. Therefore, power control can be performed in the case of carrier aggregation with different configurations.

Further, the UE can receive radio resource control RRC signaling sent by the base station, where the RRC signaling includes a TPC group identifier; the UE queries a corresponding power adjustment value set according to the TPC group identifier; and the UE obtains the power adjustment value from the found power adjustment value set according to the TPC command. If a time difference between a subframe in which a latest PUCCH is sent on the SCC and a current uplink subframe is greater than a preset first value, the UE re-sets the TPC accumulation. If the time difference between the subframe in which a latest PUCCH is sent on the SCC and the current uplink subframe is greater than a preset second value, the UE re-calculates the PUCCH transmit power according to an actual transmit power of the UE, an open loop power of the PUCCH, path loss, a compensation parameter for different PUCCH formats, and a compensation parameter for the number of bits of different uplink control information.

Figure 4:
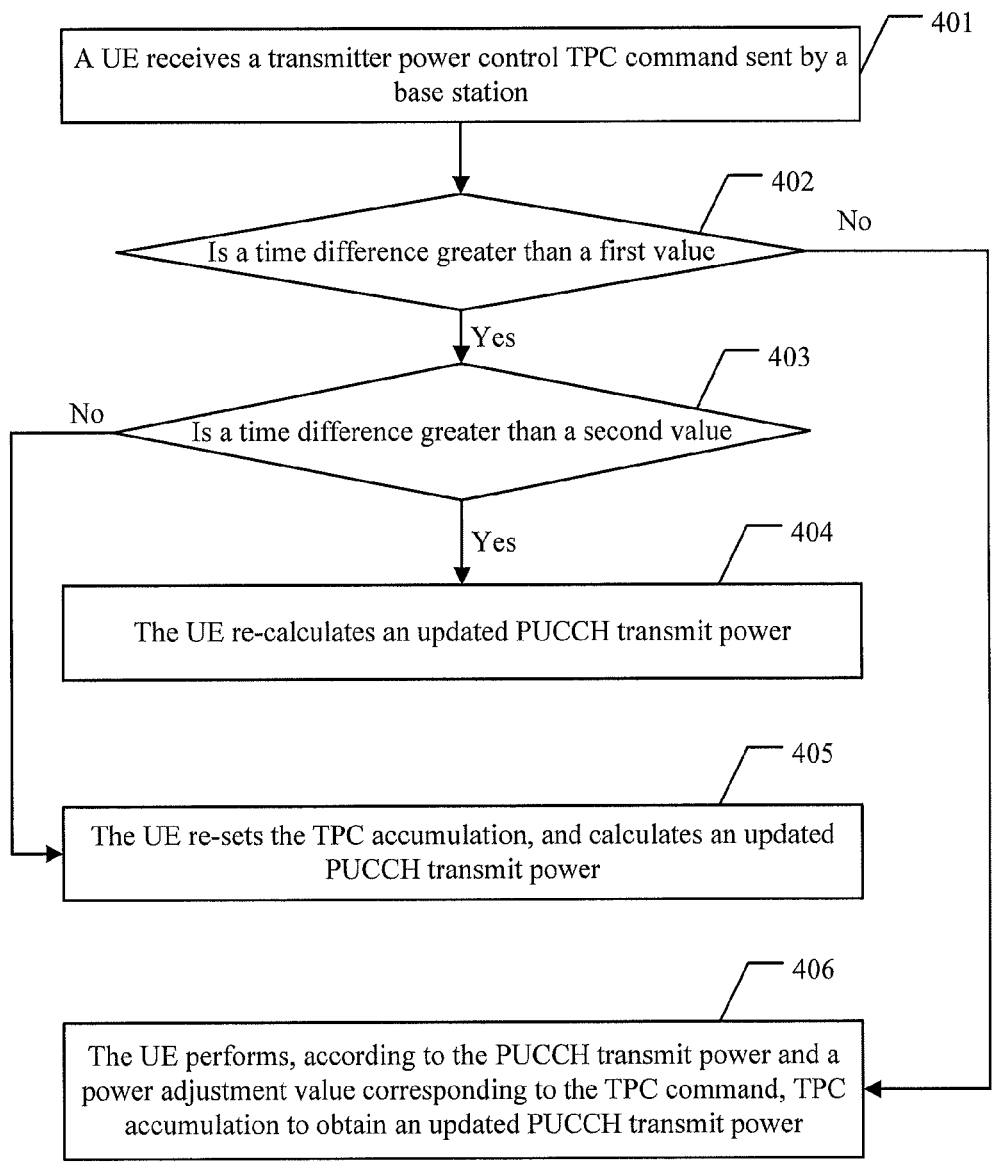
FIG. 4 is a schematic diagram of a power control method according to another embodiment of the present invention.

For ease of understanding, the following describes, by using a specific example, a power control method in detail according to the present invention. Referring to FIG. 4, a power control method according to another embodiment of the present invention includes the following steps:

401. A UE receives a TPC command sent by a base station.

Step 401 in this embodiment is similar to the content described in step 301 of the embodiment shown in the foregoing FIG. 3, and is not further described herein.

402. Determine whether a time difference is greater than a first value. If the time difference is greater than the first value, execute step 403; if the time difference is smaller than the first value, execute step 406.

The UE can query backward, starting from a current uplink subframe, for a PUCCH transmit power used when a latest PUCCH is sent within the SCC; if finding a PUCCH transmit power in a certain subframe of the SCC, the UE can calculate a time difference between the subframe and the current uplink subframe, and determine whether the time difference is greater than a first value.

The first value may be a preset value, for example, a length of 20 subframes. It can be understood that if the UE queries 20 subframes backward but still fails to find a subframe in which a latest PUCCH is sent, the UE may not continue to query but goes to step 403 directly.

403. Determine whether the time difference is greater than a second value. If the time difference is greater than the second value, execute step 404; if the time difference is smaller than the second value, execute step 405.

In this embodiment, the second value is greater than the first value, and the second value may be a preset value, for example, a length of 50 subframes. This step is similar to the foregoing step 202, and is not further described herein.

404. The UE re-calculates an updated PUCCH transmit power.

If a time difference between a subframe found by the UE in which a latest PUCCH is sent and the current uplink subframe is greater than the second value, or the time duration for the UE to query backward is greater than the second value, it indicates that the UE has not sent a PUCCH on the SCC for a long time; even if a PUCCH transmit power used when a PUCCH is sent is found later, the PUCCH transmit power has no reference value. Therefore, the UE can re-calculate the PUCCH transmit power according to the actual transmit power of the UE, the open loop power of the PUCCH, the path loss, the compensation parameter for different PUCCH formats, and the compensation parameter for the number of bits of different uplink control information. The specific calculation process may be as follows:

$$P_{PUCCH}(i) = \min(P_{CMAX}, P_{0\_PUCCH} + PL + h(n_{CQI}, n_{HARQ}) + \Delta_{F\_PUCCH}(F) + g(i));$$

Where $P_{PUCCH}(i)$ indicates a transmit power of a PUCCH in subframe i, $P_{CMAX} = \min(P_{EMAX}, P_{UMAX})$, $P_{CMAX}$ indicates an actual transmit power of the UE and is the smaller one between the maximum power transmission capability (which depends on the level of the UE) of the UE and the maximum transmit power issued by a network side.

$P_{0\_PUCCH}$ indicates the open loop power of the PUCCH, PL indicates the path loss, $\Delta_{F\_PUCCH}(F)$ indicates the compensation for different PUCCH formats, h ($n_{CQI}$, $n_{HARQ}$) indicates the compensation for the number of bits of different uplink UCI using the same PUCCH format, $n_{CQI}$ indicates the number of bits of the CQI, and $n_{HARQ}$ indicates the number of bits of the HARQ.

g(i) indicates a dynamic power control adjustment value of the PUCCH power of the current subframe i, which is calculated by using the following equation:

$$g(i) = g(i-1) + \sum_{m=0}^{M-1} \delta_{PUCCH}(i - k_m);$$

For the TDD, if subframe i is not an uplink subframe, g(i)=g(i−1), and $\delta_{PUCCH}$ indicates a power adjustment value corresponding to the TPC command and carried in the TPC command.

It should be noted that when the UE re-calculates the PUCCH transmit power, the UE re-acquires all parameters in the foregoing equation, and re-calculates the PUCCH transmit power according to the acquired parameters. The specific calculation process is common knowledge for those skilled in the art, which is not limited herein.

405. The UE re-sets the TPC accumulation, and calculates an updated PUCCH transmit power.

If a time difference between a subframe found by the UE in which a latest PUCCH is sent and the current uplink subframe is smaller than or equal to the second value but is greater than the first value, it indicates that the UE does not send a PUCCH on the SCC within a short time, where the PUCCH transmit power used when a latest PUCCH is sent has reference value to a certain extent. In this case, the UE may re-set the TPC accumulation, and calculate the updated PUCCH transmit power according to the re-set TPC accumulation.

Specifically, the UE may set g(i) in the equation in step 404 to 0, and calculate the updated PUCCH transmit power according to the set value of g(i).

406. The UE performs, according to the PUCCH transmit power and a power adjustment value corresponding to the TPC command, TPC accumulation to obtain an updated PUCCH transmit power.

In this embodiment, if a time difference between a subframe found by the UE in which a latest PUCCH is sent and the current uplink subframe is smaller than the first value, it indicates that the UE has just sent a PUCCH on the SCC. In this case, the PUCCH transmit power used when a latest PUCCH is sent is of a great reference value.

The UE can perform, according to the PUCCH transmit power and a power adjustment value corresponding to the TPC command, TPC accumulation to obtain an updated PUCCH transmit power. The specific process is shown in the equation in the foregoing step 404, and is not further described herein.

It should be noted that the TPC command received by the UE is at least one bit, a power adjustment value set is set in both the UE and the base station, and the UE can determine, according to the TPC command, a corresponding power adjustment value from the power adjustment value set.

For example, when a power adjustment value set in downlink control information (DCI, Downlink Control Information) format 3 is [−1, 0, 1, 3], the TPC command is two bits. For example, when the TPC command is 00, it indicates that the power adjustment value is −1 dB; when the TPC command is 11, it indicates that the power adjustment value is +3 dB.

When a power adjustment value set in DCI format 3A is [−1, 1], the TPC command is one bit. For example, when the TPC command is 0, it indicates that the power adjustment value is −1 dB; when the TPC command is 1, it indicates that the power adjustment value is +1 dB.

The UE can determine a corresponding power adjustment value according to the foregoing manner.

Because the UE may refer to a PUCCH transmit power used when a latest PUCCH is sent on a local carrier, a certain error may exist. To reduce the error, the following manners may be used:

1. The amplitude of the power adjustment value is increased without changing the number of bits of the TPC command:

For example, the foregoing [−1, 0, 1, 3] is changed to [−3, 0, 3, 5], and the foregoing [−1, 1] is changed to [−3, 3]. Only one example is illustrated herein. It can be understood that in actual applications, other modification manners or values may also be used.

In this manner, the number of bits of the TPC command is not changed, that is, the original two bits are still two bits, and the original one bit is still one bit. However, because the amplitude of the power adjustment value corresponding to the bit is increased, the amplitude of the power adjustment value can be increased.

2. The number of bits of the TPC command is increased to increase the amplitude of the power adjustment value:

For example, if two bits in DCI format 3 are increased to three bits, the power adjustment value set in DCI format 3 may be changed to [−5, −3, −1, 0, 1, 3, 5, 7]. Only one example is illustrated herein. It can be understood that other modification manners or values may also be used.

In this manner, the number of bits of the TPC command is increased; the original two bits may be three bits now, and the original one bit may be two bits now. Because the number of bits is increased, the number of power adjustment values corresponding to the TPC command is increased, so that the amplitude of the power adjustment value can be increased.

It should be noted that in the foregoing two modification manners, the changed power adjustment value set needs to be re-set in the UE and the base station.

3. The number of groups of power adjustment value sets is increased:

In this embodiment, the UE may preset multiple groups of power adjustment value sets, for example, [−3, 0, 3, 5], [−2, 0, 2, 4], [−1, 0, 1, 3], and the like.

In this case, the UE may determine a power adjustment value corresponding to the TPC command in the following manners:

(1) The UE may determine a TPC group identifier according to the capability of the UE, for example, a UE of an LTE new release (R11/R12) that has a relatively strong capability uses a power adjustment value set with the largest amplitude by default; if finding that the amplitude is not supported during the use, the UE uses an original preset power adjustment value set.

For example, all UEs of a new release (R11/R12) firstly use the power adjustment value set [−3, 0, 3, 5] by default; when finding that the amplitude is not supported during the use, the UE uses the original power adjustment value set, for example, [−1, 0, 1, 3].

(2) The UE receives RRC signaling sent by the base station, where the RRC signaling carries a TPC group identifier, and the UE determines a corresponding power adjustment value set according to the TPC group identifier, and uses the determined power adjustment value set.

It can be understood that in actual applications, the UE may also determine, in other manners, a power adjustment value set that needs to be used. The specific manner is not limited herein.

In this embodiment, after a UE receives a TPC command from the base station, the UE can acquire a PUCCH transmit power used when a latest PUCCH is sent on an SCC, and perform TPC accumulation according to the transmit power and the TPC command. Even if the UE does not send a PUCCH in a previous uplink subframe of the SCC, the UE can always acquire a historical value of the PUCCH transmit power. Therefore, power control can be performed in the case of carrier aggregation with different configurations.

In addition, in this embodiment, if a time difference between a moment when a latest PUCCH is sent on the SCC and a current uplink subframe is greater than a preset first value, the UE re-sets the TPC accumulation; if the time difference between the moment when a latest PUCCH is sent on the SCC and the current uplink subframe is greater than a preset second value, the UE re-calculates the PUCCH transmit power, thereby making a power control process more precise.

Furthermore, in this embodiment, the UE can select, according to indication of the base station in RRC signaling, a corresponding power adjustment value set from multiple groups of power adjustment value sets, so that the amplitude of the power adjustment value can be increased, thereby making a power control process more precise.

Figure 5:
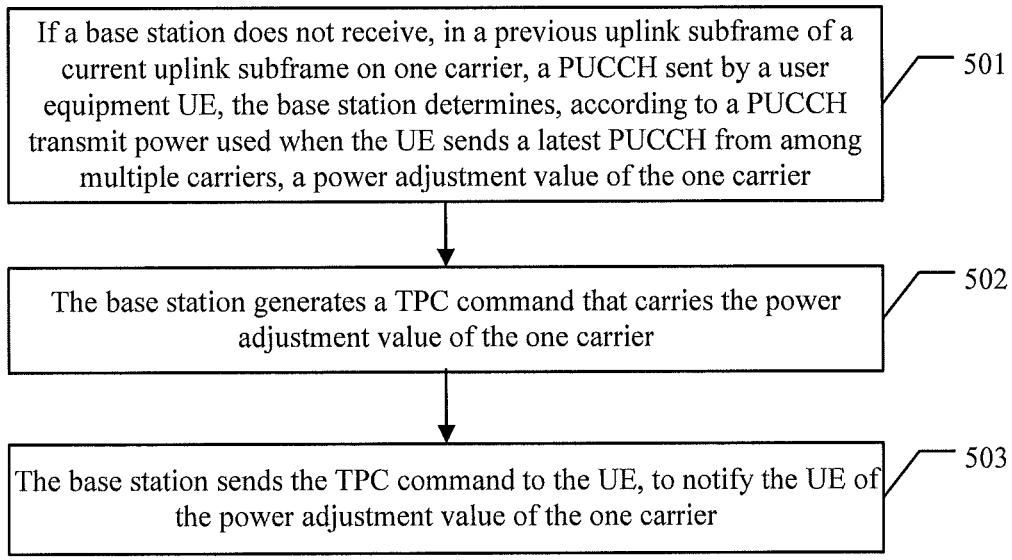
FIG. 5 is a schematic diagram of a power control method according to another embodiment of the present invention.

In the foregoing embodiments, the power control method according to the present invention is described from the perspective of the UE. The following describes, from the perspective of a base station, a power control method according to the present invention:

Referring to FIG. 5, a power control method according to another embodiment of the present invention includes the following steps:

501. If a base station does not receive, in a previous uplink subframe of a current uplink subframe on one carrier, a PUCCH sent by a UE, the base station determines, according to a PUCCH transmit power used when the UE sends a latest PUCCH from among multiple carriers, a power adjustment value of the one carrier.

In this embodiment, if the base station does not receive, in a previous uplink subframe of a current uplink subframe on one carrier, a PUCCH sent by a UE, the base station can determine, according to a PUCCH transmit power used when the UE sends a latest PUCCH from among multiple carriers, a power adjustment value of the one carrier.

It should be noted that the multiple carriers include the one carrier.

502. The base station generates a TPC command that carries the power adjustment value of the one carrier.

When the base station determines that control needs to be performed on the transmit power of the UE, the base station may generate a TPC command, where the TPC command carries the power adjustment value of the one carrier.

It should be noted that in this embodiment, the base station may determine, according to a signal to interference plus noise ratio of the UE and a signal to interference plus noise ratio threshold, whether control needs to be performed on the transmit power of the UE. It can be understood that in actual applications, the base station may also determine, in other manners, whether control needs to be performed on the transmit power of the UE. The specific manner is not limited herein.

503. The base station sends the TPC command to the UE, to notify the UE of the power adjustment value of the one carrier.

After generating the TPC command, the base station can send the TPC command to the UE, so that the UE performs corresponding power control.

It should be noted that to increase the amplitude of the power adjustment value, the base station may further execute the following operations:

(1) The base station determines a TPC group identifier.

In this embodiment, the base station may save multiple groups of power adjustment value sets, and the base station can determine a TPC group identifier corresponding to a power adjustment value set that needs to be used currently. For example, the UE can determine a TPC group identifier according to capability information of the UE or use, by default, a TPC group identifier corresponding to a power adjustment value set with the largest amplitude.

(2) The base station sends radio resource control RRC signaling that includes the TPC group identifier to the UE.

After determining the TPC group identifier, the base station may send RRC signaling that includes the TPC group identifier to the UE, so that the UE queries a corresponding power adjustment value set according to the TPC group identifier, and obtains a corresponding power adjustment value from the found power adjustment value set according to the TPC command, to perform power control.

In this embodiment, the power adjustment value set saved by the base station may be a default power adjustment value set, or an extended power adjustment value set. A specific extension manner may be similar to the extension manner described in the embodiment shown in the foregoing FIG. 2 or FIG. 4, and is not further described herein.

In this embodiment, if a base station does not receive, in a previous uplink subframe of a current uplink subframe on one carrier, a PUCCH sent by a UE, the base station can determine, according to a PUCCH transmit power used when the UE sends a latest PUCCH from among multiple carriers, a power adjustment value of one carrier, and send the power adjustment value to the UE by using a TPC command, so that the UE can perform power control.

In addition, the base station can carry a TPC group identifier in RRC signaling to instruct the UE to select a corresponding power adjustment value set from multiple groups of power adjustment value sets, so that the amplitude of the power adjustment value can be increased, thereby making a power control process more precise.

Figure 6:
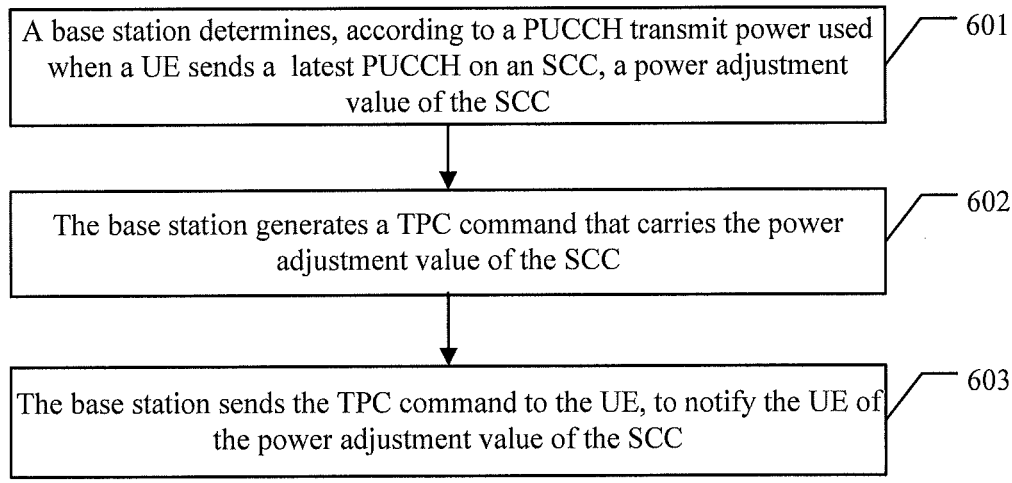
FIG. 6 is a schematic diagram of a power control method according to another embodiment of the present invention.

Referring to FIG. 6, a power control method according to another embodiment of the present invention includes the following steps:

601. A base station determines, according to a PUCCH transmit power used when a UE sends a latest PUCCH on an SCC, a power adjustment value of the SCC.

After determining, on an SCC, a PUCCH transmit power used when the UE sends a latest PUCCH on the SCC, the base station may determine a power adjustment value of the SCC according to the PUCCH transmit power.

602. The base station generates a TPC command that carries the power adjustment value of the SCC.

When the base station determines that control needs to be performed on the transmit power of the UE, the base station may generate a TPC command, where the TPC command carries the power adjustment value of the SCC.

It should be noted that in this embodiment, the base station may determine, according to a signal to interference plus noise ratio of the UE and a signal to interference plus noise ratio threshold, whether control needs to be performed on the transmit power of the UE. It can be understood that in actual applications, the base station may also determine, in other manners, whether control needs to be performed on the transmit power of the UE. The specific manner is not limited herein.

603. The base station sends the TPC command to the UE, to notify the UE of the power adjustment value of the SCC.

After generating the TPC command, the base station can send the TPC command to the UE, so that the UE performs corresponding power control.

It should be noted that to increase the amplitude of the power adjustment value, the base station may further perform other operations. Specific operations are similar to the content described in step 503 of the embodiment shown in the foregoing FIG. 5, and are not further described herein.

In this embodiment, a base station can determine, according to a PUCCH transmit power used when a UE sends a latest PUCCH on an SCC, a power adjustment value of the SCC, and send the power adjustment value to the UE by using a TPC command, so that the UE can perform power control.

In addition, the base station can carry a TPC group identifier in RRC signaling to instruct the UE to select a corresponding power adjustment value set from multiple groups of power adjustment value sets, so that the amplitude of the power adjustment value can be increased, thereby making a power control process more precise.

Figure 7:
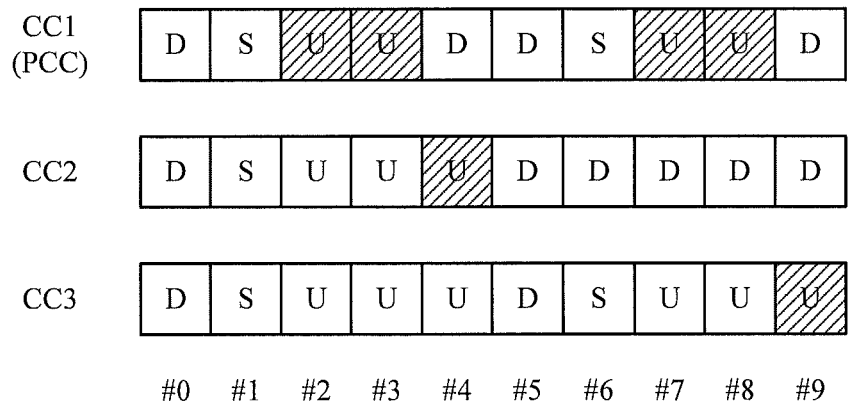
FIG. 7 is a schematic diagram of TDD carrier aggregation with different configurations according to an embodiment of the present invention.

The following uses a specific example to illustrate a power control method according to the present invention. Referring to FIG. 7, FIG. 7 is a schematic diagram of TDD carrier aggregation with different configurations according to the present invention.

It can be seen from FIG. 7 that a base station allocates multiple carriers to a UE, where CC1, CC2, and CC3 are carriers.

CC1 is a primary component carrier, and other two carriers are secondary component carriers. CC1 uses TDD mode uplink and downlink subframe configuration 1, CC2 uses TDD mode uplink and downlink subframe configuration 3, and CC3 uses TDD mode uplink and downlink subframe configuration 0, that is, carriers allocated by the base station to the UE are aggregation of carriers with different configurations. FIG. 7 provides a configuration of one frame (including 10 subframes), where D indicates a downlink subframe, S indicates a special subframe, U indicates an uplink subframe, and a grid with slashes indicates a subframe in which a PUCCH is sent.

In FIG. 7, subframe #2, subframe #3, subframe #7, and subframe #8 of CC1 are uplink subframes and are used to send a PUCCH; subframe #2, subframe #3, and subframe #4 of CC2 are uplink subframes and are used to send a PUSCH or a PUCCH; subframe #2, subframe #3, subframe #4, subframe #7, subframe #8, and subframe #9 of CC2 are uplink subframes and are used to send a PUSCH or a PUCCH.

The UE sends a PUCCH in subframe #2 and subframe #3 of CC1; when reaching subframe #4, the UE also needs to send a PUCCH, but at this time subframe #4 of CC1 is a downlink subframe and cannot send a PUCCH. In this case, the UE sends a PUCCH by using subframe #4 of CC2.

Similarly, the UE sends a PUCCH in subframe #7 and subframe #8 of CC1; when reaching subframe #9, the UE also needs to send a PUCCH, but at this time subframe #9 of CC1 is a downlink subframe and cannot send a PUCCH, and subframe #9 of CC2 is also a downlink subframe. In this case, the UE sends a PUCCH by using subframe #9 of CC3.

The following describes, according to the method in the foregoing embodiment, an acquiring process based on FIG. 7:

1. A PUCCH transmit power used when a latest PUCCH is sent is acquired within a carrier:

For CC1:

When sending a PUCCH in subframe #2, the UE may acquire a PUCCH transmit power used when subframe #8 in a previous frame of CC1 sends a PUCCH as a historical value;

When sending a PUCCH in subframe #3, the UE may acquire a PUCCH transmit power used when subframe #2 sends a PUCCH as a historical value;

When sending a PUCCH in subframe #7, the UE may acquire a PUCCH transmit power used when subframe #3 sends a PUCCH as a historical value; and When sending a PUCCH in subframe #8, the UE may acquire a PUCCH transmit power used when subframe #7 sends a PUCCH as a historical value.

For CC2:

When sending a PUCCH in subframe #4, the UE may acquire a PUCCH transmit power used when subframe #4 in a previous frame of CC2 sends a PUCCH as a historical value; if subframe #4 in the previous frame of CC2 does not send a PUCCH, the UE continues to query subframe #4 in a frame previous to the previous frame.

If subframes #4 in the previous two frames of CC2 do not send a PUCCH, it indicates that the time difference exceeds a length of 20 subframes. In this case, the UE may re-set the TPC accumulation. The specific process is similar to the process described in the method in the foregoing embodiment, and is not further described herein.

If subframes #4 in the previous five frames of CC2 do not send a PUCCH, it indicates that the time difference exceeds a length of 50 subframes. In this case, the UE may re-calculate the PUCCH transmit power. The specific process is similar to the process described in the method in the foregoing embodiment, and is not further described herein.

It should be noted that the length of 20 subframes and the length of 50 subframes described in this embodiment are only specific examples in this embodiment. It can be understood that in actual applications, these values may be modified according to actual situations, which are not specifically limited herein.

For CC3:

When sending a PUCCH in subframe #9, the UE may acquire a PUCCH transmit power used when subframe #9 in a previous frame of CC3 sends a PUCCH as a historical value; if subframe #9 in the previous frame of CC3 does not send a PUCCH, the UE continues to query subframe #9 in a frame previous to the previous frame.

If subframes #9 in the previous two frames of CC3 do not send a PUCCH, it indicates that the time difference exceeds a length of 20 subframes. In this case, the UE may re-set the TPC accumulation. The specific process is similar to the process described in the method in the foregoing embodiment, and is not further described herein.

If subframes #9 in the previous five frames of CC3 do not send a PUCCH, it indicates that the time difference exceeds a length of 50 subframes. In this case, the UE may re-calculate the PUCCH transmit power. The specific process is similar to the process described in the method in the foregoing embodiment, and is not further described herein.

It should be noted that the length of 20 subframes and the length of 50 subframes described in this embodiment are only specific examples in this embodiment. It can be understood that in actual applications, these values may be modified according to actual situations, which are not specifically limited herein.

2. A PUCCH transmit power used when a latest PUCCH is sent is acquired between carriers:

For CC1:

When sending a PUCCH in subframe #2, the UE can determine that corresponding reference subframes on CC1, CC2, and CC3 are all subframe #2, and then can calculate a time difference between the reference subframe on each carrier and a subframe in which a latest PUCCH is sent:

If a subframe in which a latest PUCCH is sent on CC1 is subframe #8 of a previous frame of CC1, the time difference of CC1 is a length of four subframes;

If a subframe in which a latest PUCCH is sent on CC2 is subframe #4 of a previous frame of CC2, the time difference of CC2 is a length of eight subframes; and If a subframe in which a latest PUCCH is sent on CC3 is subframe #9 of a previous frame of CC3, the time difference of CC3 is a length of three subframes.

It can be known from the above that the time difference of CC3 is the smallest, that is, a length of three subframes. The UE can determine that a subframe in which a latest PUCCH is sent on CC3 is subframe #9 of a previous frame of CC3. In this case, when sending a PUCCH in subframe

2, the UE may acquire a PUCCH transmit power used when subframe #9 of the previous frame on CC3 sends a PUCCH as a historical value.

Similarly, when the UE sends a PUCCH in subframe #3, it can be known that the time difference of CC1 is a length of one subframe, the time difference of CC2 is a length of nine subframes, and the time difference of CC3 is a length of four subframes, where the time difference of CC1 is the smallest, that is, a length of one subframe. The UE can determine that a subframe in which a latest PUCCH is sent on CC1 is subframe #2 of CC1. In this case, when sending a PUCCH in subframe #3, the UE may acquire a PUCCH transmit power used when subframe #2 of CC1 sends a PUCCH as a historical value.

When the UE sends a PUCCH in subframe #7, it can be known that the time difference of CC 1 is a length of four subframes, the time difference of CC2 is a length of three subframes, and the time difference of CC3 is a length of eight subframes, where the time difference of CC2 is the smallest, that is, a length of three subframes. The UE can determine that a subframe in which a latest PUCCH is sent on CC2 is subframe #4 of CC2. In this case, when the UE sends a PUCCH in subframe #7, the UE may acquire a PUCCH transmit power used when subframe #4 of CC2 sends a PUCCH as a historical value.

When the UE sends a PUCCH in subframe #8, it can be known that the time difference of CC 1 is a length of one subframe, the time difference of CC2 is a length of four subframes, and the time difference of CC3 is a length of nine subframes, where the time difference of CC1 is the smallest, that is, a length of one subframe. The UE can determine that a subframe in which a latest PUCCH is sent on CC1 is subframe #7 of CC1. In this case, when the UE sends a PUCCH in subframe #8, the UE may acquire a PUCCH transmit power used when subframe #7 of CC1 sends a PUCCH as a historical value.

For CC2:

When sending a PUCCH in subframe #4, the UE can determine that corresponding reference subframes on CC1, CC2, and CC3 are all subframe #4, and then can calculate a time difference between the reference subframe on each carrier and a subframe in which a latest PUCCH is sent:

if a subframe in which a latest PUCCH is sent on CC1 is subframe #3 of CC1, the time difference of CC1 is a length of one subframe;

if a subframe in which a latest PUCCH is sent on CC2 is subframe #4 of a previous frame of CC2, the time difference of CC2 is a length of 10 subframes; and if a subframe in which a latest PUCCH is sent on CC3 is subframe #9 of a previous frame of CC3, the time difference of CC3 is a length of five subframes.

It can be known from the above that the time difference of CC1 is the smallest, that is, a length of one subframe. The UE can determine that a subframe in which a latest PUCCH is sent on CC1 is subframe #3 of CC1. In this case, when sending a PUCCH in subframe #4, the UE may acquire a PUCCH transmit power used when subframe #3 of CC1 sends a PUCCH as a historical value.

For CC3:

When sending a PUCCH in subframe #9, the UE can determine that corresponding reference subframes on CC1, CC2, and CC3 are all subframe #9, and then can calculate a time difference between the reference subframe on each carrier and a subframe in which a latest PUCCH is sent: if a subframe in which a latest PUCCH is sent on CC1 is subframe #8 of CC1, the time difference of CC1 is a length of one subframe;

if a subframe in which a latest PUCCH is sent on CC2 is subframe #4 of CC2, the time difference of CC2 is a length of five subframes; and if a subframe in which a latest PUCCH is sent on CC3 is subframe #9 of a previous frame of CC3, the time difference of CC 3 is a length of 10 subframes.

It can be known from the above that the time difference of CC1 is the smallest, that is, a length of one subframe. The UE can determine that a subframe in which a latest PUCCH is sent on CC1 is subframe #8 of CC1. In this case, when sending a PUCCH in subframe #9, the UE may acquire a PUCCH transmit power used when subframe #8 of CC1 sends a PUCCH as a historical value.

It should be noted that in the foregoing description, the UE can query, on each carrier, an uplink subframe in which a latest PUCCH is sent on each carrier, that is, the UE needs to allocate to each carrier a storage area used to store information of the uplink subframe.

It can be understood that in actual applications, the UE may also set only one storage area. All the carriers are aligned in terms of time sequence and only one carrier sends a PUCCH when a PUCCH needs to be sent. Therefore, the UE can store, according to the time sequence and with respect to all the carriers, uplink subframes sending a latest PUCCH on all the carriers. The specific process may be as follows:

The UE allocates a storage area X, where the X is used to record an uplink subframe in which a latest PUCCH is sent.

After the UE sends a PUCCH in subframe #2 of CC1, the UE can set the X to "subframe #2 of CC1";

After the UE sends a PUCCH in subframe #3 of CC1, the UE updates the X to "subframe #3 of CC1";

After the UE sends a PUCCH in subframe #4 of CC2, the UE updates the X to "subframe #4 of CC2";

The rest may be deduced by analogy. When the UE needs to send a PUCCH in subframe #7 of CC1, the content of the X may be read as "subframe #4 of CC2". In this case, the UE may acquire a PUCCH transmit power used when subframe #4 of CC2 sends a PUCCH as a historical value.

In this embodiment, the storage area X allocated by the UE records an uplink subframe in which a latest PUCCH is sent. It can be understood that to reduce the number of bits occupied by the storage area X, in actual applications, the storage area X may store only the a PUCCH transmit power used when a latest PUCCH is sent, and does not store a specific subframe on a specific carrier. The actually used manner is not limited herein.

Figure 8:
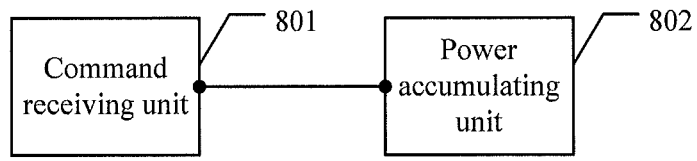
FIG. 8 is a schematic diagram of a user equipment according to an embodiment of the present invention.

The following describes a user equipment according to an embodiment of the present invention. Referring to FIG. 8, a user equipment according to an embodiment of the present invention includes:

a command receiving unit 801, configured to receive a transmitter power control TPC command sent by a base station, where the TPC command is used to indicate a power adjustment value of one carrier, and the command receiving unit 801 may be a port; and a power accumulating unit 802, configured to, when the user equipment does not send a physical uplink control channel PUCCH in a previous uplink subframe of a current uplink subframe of the one carrier, perform, according to a PUCCH transmit power used when the UE sends a latest PUCCH from among multiple carriers and the power adjustment value, TPC accumulation to obtain an updated PUCCH transmit power of the one carrier, where the multiple carriers include the one carrier. The power accumulating unit 802 may be a processor.

Figure 9:
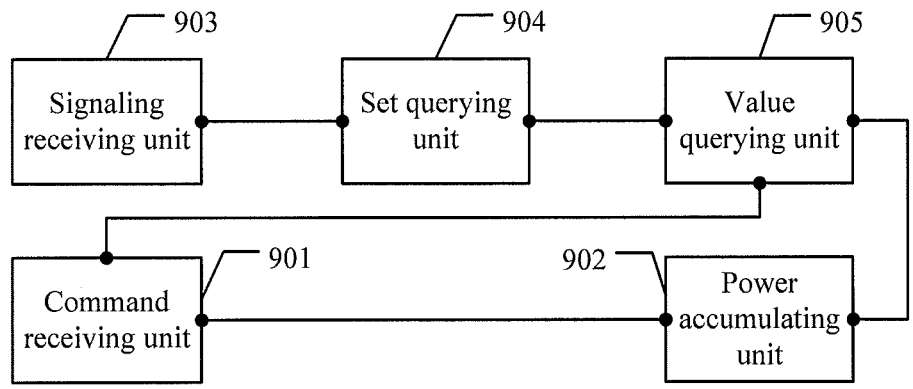
FIG. 9 is a schematic diagram of a user equipment according to another embodiment of the present invention.

The following describes in detail the user equipment provided in this embodiment. Referring to FIG. 9, a user equipment according to another embodiment of the present invention includes:

a command receiving unit 901, configured to receive a transmitter power control TPC command sent by a base station, where the TPC command is used to indicate a power adjustment value of one carrier; and a power accumulating unit 902, configured to, when the user equipment does not send a physical uplink control channel PUCCH in a previous uplink subframe of a current uplink subframe of the one carrier, perform, according to a PUCCH transmit power used when the UE sends a latest PUCCH from among multiple carriers and the power adjustment value, TPC accumulation to obtain an updated PUCCH transmit power of the one carrier, where the multiple carriers include the one carrier.

It should be noted that the command receiving unit 901 in this embodiment may be a receiving port and the power accumulating unit 902 may be a processor.

The user equipment in this embodiment may further include:

a signaling receiving unit 903, configured to receive radio resource control RRC signaling sent by the base station, where the RRC signaling includes a TPC group identifier;

a set querying unit 904, configured to query a corresponding power adjustment value set according to the TPC group identifier; and a value querying unit 905, configured to obtain, according to the TPC command, the power adjustment value in the found power adjustment value set.

For ease of understanding, the following describes communication between units of the user equipment in this embodiment in a specific application scenario:

In this embodiment, when determining that control needs to be performed on a transmit power of the UE, the base station sends a TPC command to the command receiving unit 901 of the UE, where the TPC command is used to indicate a power adjustment value of one carrier, that is, the TPC command corresponds to a power adjustment value of one carrier.

In this embodiment, the base station allocates multiple carriers to the UE, where these carriers are called a configured carrier set; the configured carriers in the configured carrier set may be classified into carriers and deactivated carriers and the carrier set includes at least one carrier.

The UE can send and receive control information on activated carriers, where the activated carriers can be scheduled to transmit uplink/downlink data, and the power accumulating unit 902 in the UE can obtain all current carriers, where all the carriers include the one carrier.

In this embodiment, after determining a carrier, the power accumulating unit 902 can calculate a time difference between a current moment and a moment when a latest PUCCH is sent on the carrier. The specific calculation manner may be as follows:

The power accumulating unit 902 can query, according to a current uplink subframe, a reference subframe which is located in the same timeslot as the current uplink subframe on each carrier. Because all the carriers are aligned in terms of time sequence, the power accumulating unit 902 can query a corresponding reference subframe on each activated carrier.

After the power accumulating unit 902 determines the reference subframe, for each carrier, the power accumulating unit 902 can query backward, starting from the reference subframe, for a subframe in which a latest PUCCH is sent on the carrier, and then calculate a time difference between the subframe and the reference subframe.

After calculating the time difference of each carrier, the power accumulating unit 902 selects a smallest time difference from the time differences of all carriers, and determines a carrier corresponding to the smallest time difference.

The power accumulating unit 902 acquires a PUCCH transmit power used when a latest PUCCH is sent on a carrier corresponding to the smallest time difference, and performs, according to the PUCCH transmit power and a power adjustment value corresponding to the TPC command, TPC accumulation to obtain an updated PUCCH transmit power.

In this embodiment, the process of performing TPC accumulation by the power accumulating unit 902 according to the PUCCH transmit power and a power adjustment value corresponding to the TPC command is similar to the content described in step 206 of the embodiment shown in the foregoing FIG. 2, and is not further described herein.

It should be noted that the TPC command received by the command receiving unit 901 is at least one bit, a power adjustment value set is set in both the UE and the base station, and the UE can determine, according to the TPC command, a corresponding power adjustment value from the power adjustment value set.

Because the UE may refer to PUCCH transmit power used when a latest PUCCH is sent on all carriers, a certain error may exist. To reduce this error, a manner similar to the content described in the embodiment shown in the foregoing FIG. 2 may be used, and is not further described herein.

It should be noted that if the number of groups of power adjustment value sets is increased by the UE and the base station, the signaling receiving unit 903 can receive RRC signaling sent by the base station, where the RRC signaling includes a TPC group identifier; the set querying unit 904 queries a corresponding power adjustment value set according to the TPC group identifier acquired by the signaling receiving unit 903; the value querying unit 905 queries, according to the TPC command acquired by the command receiving unit 901, a power adjustment value in the power adjustment value set found by the set querying unit 904.

In this embodiment, after a command receiving unit 901 receives a TPC command from a base station, if a PUCCH is not sent in a previous uplink subframe of a current uplink subframe on one carrier, a power accumulating unit 902 can acquire, according to all carriers, a PUCCH transmit power used when a latest PUCCH is sent, and perform TPC accumulation according to the transmit power and the TPC command. Because the power accumulating unit 902 can acquire the PUCCH transmit power according to all the carriers and when an A/N is sent, a PUCCH must be sent in an uplink subframe of a certain carrier, the UE can always acquire a historical value of the PUCCH transmit power so that no matter on which carrier a current uplink subframe of the UE that needs to send a PUCCH is located. Therefore, power control can be performed in the case of carrier aggregation with different configurations.

Figure 10:
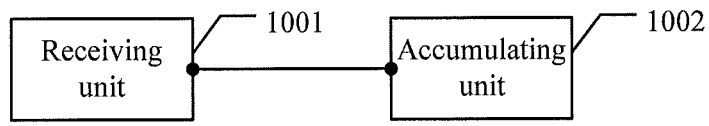
FIG. 10 is a schematic diagram of a user equipment according to another embodiment of the present invention.

Referring to FIG. 10, a user equipment according to another embodiment of the present invention includes:

a receiving unit 1001, configured to receive a transmitter power control TPC command sent by a base station, where the TPC command is used to indicate a power adjustment value of an SCC, and the receiving unit 1001 may be a port; and an accumulating unit 1002, configured to perform, according to a PUCCH transmit power used when a latest physical uplink control channel PUCCH is sent on the SCC and the power adjustment value, TPC accumulation to obtain an updated PUCCH transmit power of the SCC. The accumulating unit 1002 may be a processor.

Figure 11:
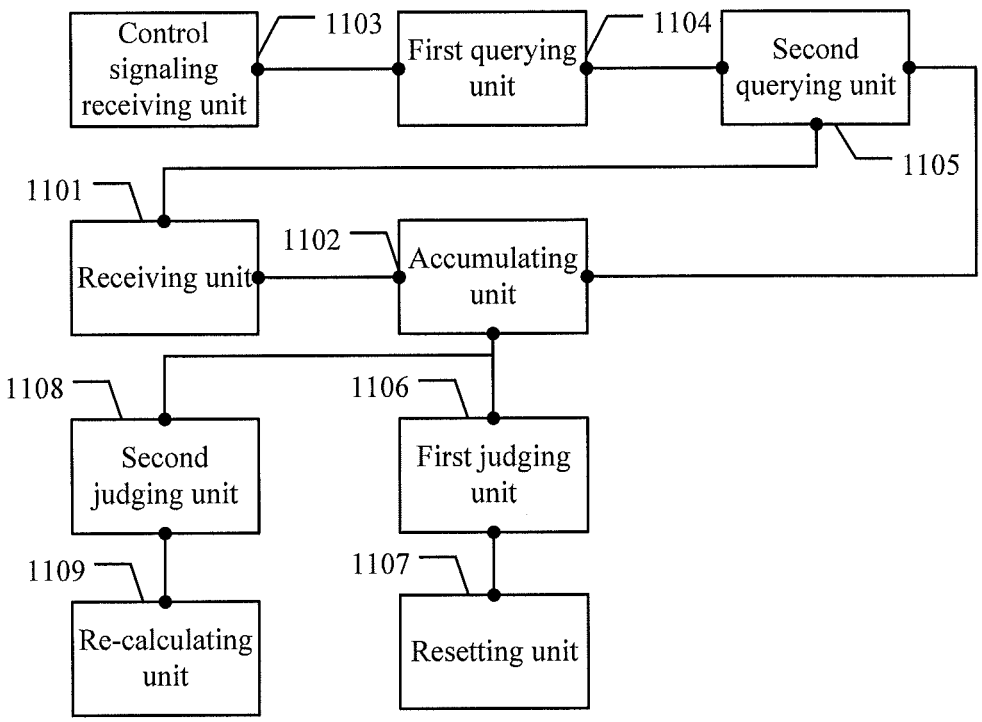
FIG. 11 is a schematic diagram of a user equipment according to another embodiment of the present invention.

The following describes in detail the user equipment provided in this embodiment. Referring to FIG. 11, a user equipment according to another embodiment of the present invention includes:

a receiving unit 1101, configured to receive a TPC command sent by a base station, where the TPC command is used to indicate a power adjustment value of an SCC; and an accumulating unit 1102, configured to perform, according to a PUCCH transmit power used when a latest physical uplink control channel PUCCH is sent on the SCC and the power adjustment value, TPC accumulation to obtain an updated PUCCH transmit power of the SCC.

It should be noted that the receiving unit 1101 in this embodiment may be a receiving port and the accumulating unit 1102 may be a processor.

The user equipment in this embodiment may further include:

a control signaling receiving unit 1103, configured to receive RRC signaling sent by the base station, where the RRC signaling includes a TPC group identifier;

a first querying unit 1104, configured to query a corresponding power adjustment value set according to the TPC group identifier acquired by the control signaling receiving unit 1103; and a second querying unit 1105, configured to query, according to the TPC command acquired by the receiving unit 1101, a corresponding power adjustment value in the power adjustment value set found by the first querying unit 1104.

The control signaling receiving unit 1103 in this embodiment may also be a receiving port.

The user equipment in this embodiment may further include:

a first judging unit 1106, configured to determine whether a time difference between a subframe in which a latest PUCCH is sent on the SCC and a current uplink subframe is greater than a preset first value; and a re-setting unit 1107, configured to re-set the TPC accumulation when the first judging unit 1106 determines that the time difference between a subframe in which a latest PUCCH is sent on the SCC and the current uplink subframe is greater than the preset first value.

The user equipment in this embodiment may further include:

a second judging unit 1108, configured to determine whether a time difference between a subframe in which a latest PUCCH is sent on the SCC and the current uplink subframe is greater than a preset second value; and a re-calculating unit 1109, configured to, when the second judging unit 1108 determines that the time difference between a subframe in which a latest PUCCH is sent on the SCC and the current uplink subframe is greater than the preset second value, re-calculate the PUCCH transmit power according to an actual transmit power of the UE, an open loop power of the PUCCH, path loss, a compensation parameter for different PUCCH formats, and a compensation parameter for the number of bits of different uplink control information.

For ease of understanding, the following describes communication between units of the user equipment in this embodiment in a specific application scenario:

In this embodiment, when determining that control needs to be performed on a transmit power of the UE, the base station sends a TPC command to the receiving unit 1101 in the UE, where the TPC command is used to indicate a power adjustment value of the SCC, that is, the TPC command corresponds to a power adjustment value of the SCC.

After receiving the TPC command sent by the base station, the receiving unit 1101 learns that adjustment needs to be performed on the transmit power and knows that adjustment needs to be performed on the transmit power of the SCC.

When the base station schedules a PCC, the DCI carrying the TPC does not include a carrier index field CIF (Carrier Index Field); when the base station schedules an SCC, the DCI carrying the TPC includes a CIF that is used to indicate which CC is specifically scheduled; fields in the DCI such as TPC are also used by the CC, so the UE can determine, according to this parameter, which carrier's transmit power is adjusted.

The accumulating unit 1102 in the UE can query backward, starting from a current uplink subframe within the SCC, for a PUCCH transmit power used when a latest PUCCH is sent; if finding a PUCCH transmit power in a certain subframe of the SCC, the accumulating unit 1102 can calculate a time difference between the subframe and the current uplink subframe, and the first judging unit 1106 determines whether the time difference is greater than a first value.

The first value may be a preset value, for example, a length of 20 subframes. It can be understood that if the accumulating unit 1102 queries 20 subframes backward but still fails to find a subframe in which a latest PUCCH is sent, the accumulating unit 1102 may not continue to query.

In this embodiment, the second judging unit 1108 can determine whether the time difference is greater than a second value, where the second value is greater than the first value and may be a preset value, for example, a length of 50 subframes.

If the second judging unit 1108 determines that the time difference between a subframe in which a latest PUCCH is sent and the current uplink subframe is greater than the second value, or the time duration taken by the UE to perform backward query is greater than the second value, it indicates that the UE has not sent a PUCCH on the SCC for a long time; even if a PUCCH transmit power used when a PUCCH is sent is found backward, the PUCCH transmit power has no reference value. Therefore, the re-calculating unit 1109 can re-calculate the PUCCH transmit power according to the actual transmit power of the UE, the open loop power of the PUCCH, the path loss, the compensation parameter for different PUCCH formats, and the compensation parameter for the number of bits of different uplink control information. The specific calculation process is similar to the process described in the embodiment shown in the foregoing FIG. 4, and is not further described herein.

If the first judging unit 1106 determines that the time difference between a subframe in which a latest PUCCH is sent and the current uplink subframe is smaller than or equal to the second value but is greater than the first value, it indicates that the UE does not send a PUCCH on the SCC within a short time, where the PUCCH transmit power used when a latest PUCCH is sent has reference value to a certain extent. In this case, the re-setting unit 1107 may re-set the TPC accumulation, and calculate the updated PUCCH transmit power according to the re-set TPC accumulation.

The specific re-setting process is similar to the process described in the embodiment shown in the foregoing FIG. 4, and is not further described herein.

In this embodiment, if the first judging unit 1106 determines that the time difference between a subframe in which a latest PUCCH is sent and the current uplink subframe is smaller than the first value, it indicates that the UE has just sent a latest PUCCH on the SCC. In this case, the PUCCH transmit power used when a latest PUCCH is sent is of a great reference value.

The accumulating unit 1102 can perform TPC accumulation according to the PUCCH transmit power and a power adjustment value corresponding to the TPC command, to obtain an updated PUCCH transmit power.

It should be noted that the TPC command received by the command receiving unit 1101 is at least one bit, a power adjustment value set is preset in both the UE and the base station, and the UE can determine, according to the TPC command, a corresponding power adjustment value from the power adjustment value set.

Because the UE may refer to a PUCCH transmit power used when a latest PUCCH is sent on a local carrier, a certain error may exist. To reduce this error, a manner similar to the content described in the embodiment shown in the foregoing FIG. 4 may be used, and is not further described herein.

It should be noted that if the number of groups of power adjustment value sets is increased by the UE and the base station, the control signaling receiving unit 1103 can receive RRC signaling sent by the base station, where the RRC signaling includes a TPC group identifier; the first querying unit 1104 queries a corresponding power adjustment value set according to the TPC group identifier acquired by the control signaling receiving unit 1103; and the second querying unit 1105 queries, according to the TPC command acquired by the receiving unit 1101, a corresponding power adjustment value in the power adjustment value set found by the first querying unit 1104.

In this embodiment, after a receiving unit 1101 receives a TPC command from a base station, an accumulating unit 1102 can acquire a PUCCH transmit power used when a latest PUCCH is sent on the SCC, and the accumulating unit 1102 performs TPC accumulation according to the transmit power and the TPC command. Even if the UE does not send a PUCCH in a previous uplink subframe of a current uplink subframe, the UE can always acquire a historical value of the PUCCH transmit power. Therefore, power control can be performed in the case of carrier aggregation with different configurations.

Figure 12:
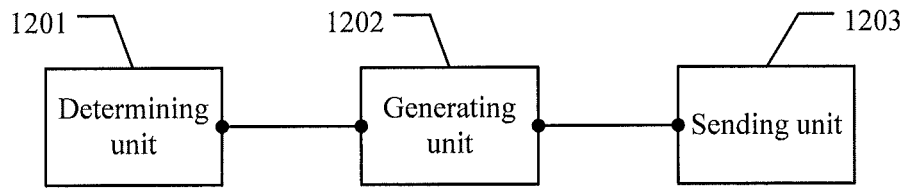
FIG. 12 is a schematic diagram of a base station according to an embodiment of the present invention.

The following describes a base station according to an embodiment of the present invention. Referring to FIG. 12, a base station according to an embodiment of the present invention includes:

a determining unit 1201, configured to, when the base station does not receive, in a previous uplink subframe of a current uplink subframe on one carrier, a PUCCH sent by the UE, determine, according to a PUCCH transmit power used when the UE sends a latest PUCCH from among multiple carriers, a power adjustment value of the one carrier, where the multiple carriers include the one carrier; the determining unit 1201 may be a processor;

a generating unit 1202, configured to generate a transmitter power control TPC command that carries the power adjustment value of the one carrier; and a sending unit 1203, configured to send the TPC command to the UE, to notify the UE of the power adjustment value of the one carrier. The sending unit 1203 may be a port.

In this embodiment, if a base station does not receive, in a previous uplink subframe of a current uplink subframe on one carrier, a PUCCH sent by a UE, a determining unit 1201 can determine, according to a PUCCH transmit power used when the UE sends a latest PUCCH from among multiple carriers, a power adjustment value of one carrier.

It should be noted that the multiple carriers include the one carrier.

When the base station determines that control needs to be performed on the transmit power of the UE, a generating unit 1202 may generate a TPC command, where the TPC command carries the power adjustment value of the one carrier.

After the generating unit 1202 generates the TPC command, the sending unit 1203 can send the TPC command to the UE, so that the UE performs corresponding power control.

It should be noted that, to increase the amplitude of the power adjustment value, the base station may further perform other operations. Specific operations are similar to the content described in step 503 of the embodiment shown in the foregoing FIG. 5, and are not further described herein.

In this embodiment, if a base station does not receive, in a previous uplink subframe of a current uplink subframe on one carrier, a PUCCH sent by a UE, a determining unit 1201 can determine, according to a PUCCH transmit power used when the UE sends a latest PUCCH from among multiple carriers, a power adjustment value of one carrier, and send the power adjustment value to the UE by using a TPC command, so that the UE can perform power control.

In addition, the base station can carry a TPC group identifier in RRC signaling to instruct the UE to select a corresponding power adjustment value set from multiple groups of power adjustment value sets, so that the amplitude of the power adjustment value can be increased, thereby making a power control process more precise.

Figure 13:
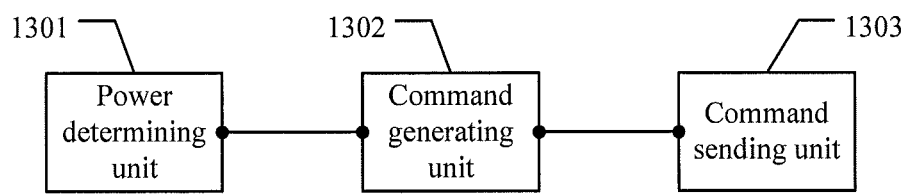
FIG. 13 is a schematic diagram of a base station according to another embodiment of the present invention.

Referring to FIG. 13, a base station according to an embodiment of the present invention includes:

a power determining unit 1301, configured to determine a power adjustment value of an SCC according to a PUCCH transmit power used when a UE sends a latest physical uplink control channel PUCCH on the SCC, where the power determining unit 1301 may be a processor;

a command generating unit 1302, configured to generate a transmitter power control TPC command that carries the power adjustment value of the SCC; and a command sending unit 1303, configured to send the TPC command to the UE, to notify the UE of the power adjustment value of the SCC. The command sending unit 1303 may be a port.

In this embodiment, after the base station determines, on an SCC, a PUCCH transmit power used when the UE sends a latest PUCCH on the SCC, the power determining unit 1301 may determine a power adjustment value of the SCC according to the PUCCH transmit power.

When the base station determines that control needs to be performed on the transmit power of the UE, the command generating unit 1302 may generate a TPC command, where the TPC command carries the power adjustment value of the SCC.

After the command generating unit 1302 generates the TPC command, the command sending unit 1303 may send the TPC command to the UE, so that the UE performs corresponding power control.

It should be noted that, to increase the amplitude of the power adjustment value, the base station may further perform other operations. Specific operations are similar to the content described in step 603 of the embodiment shown in the foregoing FIG. 6, and are not further described herein.

In this embodiment, the power determining unit 1301 may determine, according to a PUCCH transmit power used when a UE sends a latest PUCCH on an SCC, a power adjustment value of the SCC, and send the power adjustment value to the UE by using a TPC command, so that the UE can perform power control.

In addition, the base station can carry a TPC group identifier in RRC signaling to instruct the UE to select a corresponding power adjustment value set from multiple groups of power adjustment value sets, so that the amplitude of the power adjustment value can be increased, thereby making a power control process more precise.

A person of ordinary skill in the art may understand that, all or a part of the steps of the methods in the foregoing embodiments may be implemented by a program instructing relevant hardware. The program may be stored in a computer readable storage medium, such as a read-only memory, a magnetic disk, or a compact disc.

A power control method, a user equipment, and a base station provided by the present invention have been described in detail. Those skilled in the art can make modifications to the specific implementation manner and application scope according to the idea of the embodiments of the present invention. Therefore, contents of this specification should not be understood as to limit the present invention.

What is claimed is:

1. A power control method, comprising:
receiving, by a user equipment (UE), a transmitter power control (TPC) command sent by a base station, wherein the TPC command is used to indicate a power adjustment value of one carrier;
if the UE does not send a physical uplink control channel (PUCCH) in a previous uplink subframe of a current uplink subframe of the one carrier, performing, by the UE, according to a PUCCH transmit power used when the UE sends a latest PUCCH from among multiple carriers and the power adjustment value, TPC accumulation to obtain an updated PUCCH transmit power of the one carrier, wherein the multiple carriers comprise the one carrier;
adjusting a transmit power of the one carrier according to the power adjustment value;
for each carrier, calculating, by UE, a time difference between a current moment and a moment when the latest PUCCH is sent on the each carrier;
querying, by the UE, a carrier with the smallest time difference;
acquiring, by the UE, a PUCCH transmit power used when a latest PUCCH is sent on the found carrier; and
obtaining, by the UE, according to the TPC command, the power adjustment value in the found power adjustment value set.

2. The method according to claim 1, further comprising:
receiving, by the UE, radio resource control RRC signaling sent by the base station, wherein the RRC signaling comprises a TPC group identifier; and
querying, by the UE, a power adjustment value set according to the TPC group identifier.

3. The method according to claim 2, further comprising:
for each carrier, calculating, by the UE, a time difference between a current moment and a moment when the latest PUCCH is sent on the each carrier;
querying, by the UE, a carrier with the smallest time difference; and
acquiring, by the UE, a PUCCH transmit power used when a latest PUCCH is sent on the found carrier.

4. The method according to claim 2, wherein the power adjustment value set is a default power adjustment value set or an extended power adjustment value set.

5. A power control method, comprising:
if a base station does not receive, in a previous uplink subframe of a current uplink subframe on one carrier, a physical uplink control channel (PUCCH) sent by a user equipment UE, determining, by the base station, according to a PUCCH transmit power used when the UE sends a latest PUCCH from among multiple carriers, a power adjustment value of the one carrier, wherein the multiple carriers comprise the one carrier;
generating, by the base station, a transmitter power control (TPC) command that carries the power adjustment value of the one carrier;
sending, by the base station, the TPC command to the UE, to notify the UE of the power adjustment value of the one carrier; and
adjusting a transmit power of the one carrier according to the power adjustment value;
for each carrier, calculating, by the UE, a time difference between a current moment and a moment when the latest PUCCH is sent on the each carrier;
querying, by the UE, a carrier with the smallest time difference;
acquiring, by the UE, a PUCCH transmit power used when a latest PUCCH is sent on the found carrier; and
obtaining, by the UE, according to the TPC command, the power adjustment value in the found power adjustment value set.

6. The method according to claim 5, further comprising:
determining, by the base station, a TPC group identifier, wherein the TPC group identifier is used to indicate a power adjustment value set; and
sending, by the base station, radio resource control (RRC) signaling that carries the TPC group identifier to the UE, so that the UE queries a corresponding power adjustment value set according to the TPC group identifier, and acquires, according to the TPC command, the power adjustment value in the found power adjustment value set to perform power control.

7. A power control method, comprising:
receiving, by a user equipment (UE), a transmitter power control (TPC) command sent by a base station, wherein the TPC command is used to indicate a power adjustment value of a secondary component carrier (SCC);
performing, by the UE, according to a PUCCH transmit power used when a latest physical uplink control channel (PUCCH) is sent on the SCC and the power adjustment value, TPC accumulation to obtain an updated PUCCH transmit power of the SCC; and
adjusting a transmit power of the SCC according to the power adjustment value;
for each carrier, calculating, by UE, a time difference between a current moment and a moment when the latest PUCCH is sent on the each carrier;
querying, by the UE, a carrier with the smallest time difference;
acquiring, by the UE, a PUCCH transmit power used when a latest PUCCH is sent on the found carrier; and
obtaining, by the UE, according to the TPC command, the power adjustment value in the found power adjustment value set.

8. The method according to claim 7, further comprising:
receiving, by the UE, radio resource control (RRC) signaling that carries a TPC group identifier sent from the base station,
querying, by the UE, a corresponding power adjustment value set according to the TPC group identifier; and acquiring, by the UE, according to the TPC command, the power adjustment value in the found power adjustment value set.

9. A power control method, comprising:
determining, by a base station, according to a physical uplink control channel (PUCCH)transmit power used when a user equipment (UE) sends a latest PUCCH on a secondary component carrier (SCC), a power adjustment value of the SCC;
generating, by the base station, a transmitter power control (TPC) command that carries the power adjustment value of the SCC;
sending, by the base station, the TPC command to the UE, to notify the UE of the power adjustment value of the SCC; and
adjusting a transmit power of the SCC according to the power adjustment value;
for each carrier, calculating, by UE, a time difference between a current moment and a moment when the latest PUCCH is sent on the each carrier;
querying, by the UE, a carrier with the smallest time difference;
acquiring, by the UE, a PUCCH transmit power used when a latest PUCCH is sent on the found carrier; and
obtaining, by the UE, according to the TPC command, the power adjustment value in the found power adjustment value set.

10. The method according to claim 9, further comprising:
determining, by the base station, a TPC group identifier, wherein the TPC group identifier is used to indicate a power adjustment value set; and
sending, by the base station, radio resource control (RRC) signaling that carries the TPC group identifier to the UE, so that the UE queries a corresponding power adjustment value set according to the TPC group identifier, and acquires, according to the TPC command, the power adjustment value in the found power adjustment value set to perform power control.

11. A user equipment, comprising:
a processor, and
a memory storing instructions that, when executed by the processor, cause the processor to;
receive a transmitter power control (TPC) command sent by a base station, wherein the TPC command is used to indicate a power adjustment value of one carrier;
if the user equipment does not send a physical uplink control channel (PUCCH) in a previous uplink subframe of a current uplink subframe of the one carrier, perform, according to a PUCCH transmit power used when the UE sends a latest PUCCH from among multiple carriers and the power adjustment value, TPC accumulation to obtain an updated PUCCH transmit power of the one carrier, wherein the multiple carriers comprise the one carrier; and
adjust transmit power of the one carrier according to the power adjustment value;
for each carrier, calculating, by UE, a time difference between a current moment and a moment when the latest PUCCH is sent on the each carrier;
query, by the UE, a carrier with the smallest time difference;
acquire, by the UE, a PUCCH transmit power used when a latest PUCCH is sent on the found carrier; and
obtain, by the UE, according to the TPC command, the power adjustment value in the found power adjustment value set.

12. The user equipment according to claim 11, further comprising:
receive radio resource control (RRC) signaling sent by the base station, wherein the RRC signaling comprises a TPC group identifier;
query a corresponding power adjustment value set according to the TPC group identifier; and
obtain, according to the TPC command, the power adjustment value in the found power adjustment value set.

13. A user equipment, comprising:
a receiver, configured to receive a transmitter power control (TPC) command sent by a base station, wherein the TPC command is used to indicate a power adjustment value of an SCC;
a processor configured to perform, according to a PUCCH transmit power used when a latest physical uplink control channel (PUCCH) is sent on the SCC and the power adjustment value, TPC accumulation to obtain an updated PUCCH transmit power of the SCC; and
the processor configured to adjust a transmit power of the SCC according to the power adjustment value;
for each carrier, calculating, by UE, a time difference between a current moment and a moment when the latest PUCCH is sent on the each carrier;
querying, by the UE, a carrier with the smallest time difference;
acquiring, by the UE, a PUCCH transmit power used when a latest PUCCH is sent on the found carrier; and
obtaining, by the UE, according to the TPC command, the power adjustment value in the found power adjustment value set.

14. A base station, comprising:
a processor, and
a memory storing instructions that, when executed by the processor, cause the processor to;
when the base station does not receive, in a previous uplink subframe of a current uplink subframe on one carrier, a physical uplink control channel (PUCCH) sent by a user equipment (UE), determine, according to a PUCCH transmit power used when the UE sends a latest PUCCH from among multiple carriers, a power adjustment value of the one carrier, wherein the multiple carriers comprise the one carrier;
generate a transmitter power control (TPC) command that carries the power adjustment value of the one carrier;
send the TPC command to the UE, to notify the UE of the power adjustment value of the one carrier; and
adjust a transmit power of the one carrier according to the power adjustment value;
for each carrier, calculating, by UE, a time difference between a current moment and a moment when the latest PUCCH is sent on the each carrier;
query, by the UE, a carrier with the smallest time difference;
acquiring, by the UE, a PUCCH transmit power used when a latest PUCCH is sent on the found carrier; and
obtain, by the UE, according to the TPC command, the power adjustment value in the found power adjustment value set.

15. A base station, comprising:
a processor, and
a memory storing instructions that, when executed by the processor, cause the processor to;
determine, according to a physical uplink control channel (PUCCH) transmit power used when a user equipment (UE) sends a latest PUCCH on a secondary component carrier (SCC), a power adjustment value of the SCC;

generate a transmitter power control (TPC) command that carries the power adjustment value of the SCC;
send the TPC command to the UE, to notify the UE of the power adjustment value of the SCC; and
adjust a transmit power of the SCC according to the power adjustment value;
for each carrier, calculating, by the UE, a time difference between a current moment and a moment when the latest PUCCH is sent on the each carrier;
querying, by the UE, a carrier with the smallest time difference;
acquiring, by the UE, a PUCCH transmit power used when a latest PUCCH is sent on the found carrier; and
obtaining, by the UE, according to the TPC command, the power adjustment value in the found power adjustment value set.

* * * * *

UNITED STATES PATENT AND TRADEMARK OFFICE
CERTIFICATE OF CORRECTION

PATENT NO. : 9,439,154 B2  Page 1 of 1
APPLICATION NO. : 14/039569
DATED : September 6, 2016
INVENTOR(S) : Xingwei Zhang et al.

It is certified that error appears in the above-identified patent and that said Letters Patent is hereby corrected as shown below:

In the Claims

Column 25, Line 41, Claim 1:

After "calculating, by" insert --the--, therefor.

Column 27, Line 19, Claim 9:

After "calculating, by" insert --the--, therefor.

Column 28, Line 22, Claim 12:

After "calculating, by" insert --the--, therefor.

Column 28, Line 50, Claim 14:

After "calculating, by" insert --the--, therefor.

Signed and Sealed this
Fifteenth Day of November, 2016

Michelle K. Lee
*Director of the United States Patent and Trademark Office*